United States Patent [19]

Kambour et al.

[11] Patent Number: 5,281,669

[45] Date of Patent: Jan. 25, 1994

[54] BLENDS OF LINEAR POLYMERS WITH MACROCYCLIC OLIGOMERS

[75] Inventors: Roger P. Kambour; Warren L. Nachlis, both of Schenectady; Eric J. Pearce, Clifton Park, all of N.Y.; Jeffrey D. Carbeck, Cambridge, Mass.

[73] Assignee: General Electric Company, Schenectady, N.Y.

[21] Appl. No.: 867,558

[22] Filed: Apr. 13, 1992

[51] Int. Cl.⁵ ............... C08L 67/02; C08L 69/00
[52] U.S. Cl. ........................... 525/177; 525/146; 525/148; 525/176; 525/394; 525/425; 525/433; 525/462; 525/466; 525/488; 525/535
[58] Field of Search ............. 525/146, 148, 176, 177, 525/394, 397, 425, 433, 462, 466, 535

[56] References Cited

U.S. PATENT DOCUMENTS

| | | | |
|---|---|---|---|
| 4,644,053 | 2/1987 | Brunelle et al. | 528/371 |
| 4,696,998 | 9/1987 | Brunelle et al. | 528/272 |
| 4,760,117 | 7/1988 | Evans | 525/464 |
| 4,829,144 | 5/1989 | Brunelle et al. | 528/176 |
| 4,916,189 | 4/1990 | Fontana | 525/186 |
| 4,920,200 | 4/1990 | Brunelle et al. | 528/370 |
| 4,980,453 | 12/1990 | Brunelle et al. | 528/352 |
| 5,039,783 | 8/1991 | Brunelle et al. | 528/272 |
| 5,162,459 | 11/1992 | Krabbenhoft | 525/462 |
| 5,191,013 | 3/1993 | Cook | 528/272 |

*Primary Examiner*—David Buttner
*Attorney, Agent, or Firm*—William H. Pittman

[57] ABSTRACT

Intimate blends of macrocyclic oligomer compositions, such as cyclic polycarbonate or poly(alkylene dicarboxylate) oligomer mixtures, are blended with linear polymers, especially addition polymers. The blends flow easily and are frequently homogeneous. The macrocyclic oligomers therein may be polymerized to produce resin blends having advantageous properties.

5 Claims, No Drawings

BLENDS OF LINEAR POLYMERS WITH MACROCYCLIC OLIGOMERS

This invention relates to polymer blends, and more particularly to blends of linear polymers and macrocyclic oligomers.

The chemistry of macrocyclic oligomers has been the subject of considerable study over the past several years. (As used herein, the term "macrocyclic" designates an oligomer having an overall cyclic structure, independent of cyclic moieties such as benzene rings in the structural units thereof.) Macrocyclic oligomers of many different molecular structures have been disclosed, the primary variations being the macrocyclic polycarbonate oligomers disclosed in U.S. Pat. No. 4,644,053, the macrocyclic polyester and especially polyarylate oligomers of U.S. Pat. No. 4,829,144, and the macrocyclic poly(alkylene dicarboxylate) oligomers whose preparation is the subject of U.S. Pat. No. 5,039,783.

An even larger number of patents directed to reactions of the macrocyclic oligomers is in existence. Said oligomers may be polymerized by heating with certain types of catalysts, they may be copolymerized with other polymers, and they may be crosslinked or used in the formation of crosslinked materials. Thus, a large body of art exists on reactions involving the macrocyclic oligomers in combination with other reagents including polymers.

The present invention is based on the discovery that macrocyclic oligomers may be physically blended with numerous types of linear polymers to form blends with a potential for various uses. These blends flow easily and are frequently homogeneous, although heterogeneous blends are also within the scope of the invention. They often have glass transition temperatures intermediate between that of the macrocyclic oligomer(s) and that of the linear polymer constituent of the blend. Depending on the macrocyclic oligomer(s) and polymer employed, polymerization of the macrocyclic oligomer(s) may lead to polymer blends having advantageous properties such as solvent resistance.

In one of its aspects, therefore, the invention includes compositions comprising intimate physical mixtures of at least one macrocyclic oligomer comprising principally carbon, hydrogen and oxygen, and at least one linear polymer consisting essentially of structural units different from those of said macrocyclic oligomer.

Any of the known macrocyclic oligomers may be employed in the method of this invention. The only limitation is that the oligomer(s) should comprise principally carbon, hydrogen and oxygen. Thus, cyclic polydiorganosiloxane oligomers (for example) are not contemplated.

Included are the polycarbonate, polyarylate and poly(alkylene dicarboxylate) oligomers disclosed in the aforementioned U.S. Pat. Nos. 4,644,053, 4,829,144 and 5,039,783. Other oligomers of these types are disclosed in U.S. Pat. Nos. 4,920,200 and 4,980,453. In addition, the macrocyclic hetereocarbonates of U.S. Pat. No. 4,696,998 may be employed; they contain carbonate structural units in combination with units containing such moieties as amide, ester, ether, ether imide, ether ketone, ether ester, ether sulfone, urethane, urea, amideimide, sulfide, sulfone, orthocarbonate, ortho ester, sulfonamide, imidazole, benzoxazole, benzothiazole, phosphate, phosphite, phosphoramidate, phosphonate and phosphazene groups.

In addition, various types of macrocyclic oligomer molecules containing other than carbonate or ester structural units may be employed. Many of these, particularly including spiro(bis)indane moieties, are disclosed in U.S. Pat. No. 4,980,453. They include macrocyclic polyamides, polyimides, polyamideimides, polyetherketones and polyethersulfones. The aforementioned patents disclosing said macrocyclic oligomers are incorporated herein by reference. Mixtures of macrocyclic oligomers having identical structural units and differing degrees of polymerization are most often employed, since they are conveniently prepared without the necessity for separating one oligomer from another. Moreover, they generally have low viscosity in the liquid state and are therefore easy to handle.

In most instances, the preferred macrocyclic oligomer compositions employed in the invention are macrocyclic polycarbonate and poly(alkylene dicarboxylate) oligomers. Oligomers of these types often impart particularly advantageous properties to the compositions incorporating them, especially after polymerization of the macrocyclic oligomers to linear polycarbonates or polyesters.

Suitable macrocyclic polycarbonate oligomer compositions include those comprising a plurality of structural units of the formula

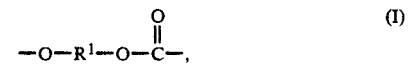

wherein at least about 60% of the total number of $R^1$ values are divalent aromatic organic radicals, the balance thereof being aliphatic, alicyclic or aromatic organic radicals. Such compositions include dimers, trimers and tetramers, as well as cyclic polycarbonate oligomer mixtures.

The $R^1$ values may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is also incorporated by reference herein. Also included are radicals containing nonhydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 80% of the total number of $R^1$ values in the cyclic oligomer mixtures, and most desirable all of said $R^1$ values, are aromatic. The aromatic $R^1$ radicals preferably have the formula (II) 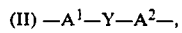

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gemalkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

Suitable macrocyclic poly(alkylene dicarboxylate) oligomers include those comprising structural units of the formula

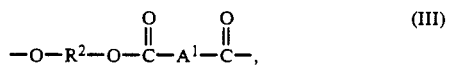

(III)

wherein $R^2$ is an alkylene or mono- or polyoxyalkylene radical containing a straight chain of about 2-8 atoms and $A^1$ is as previously defined. Most often, $R^2$ is a $C_{2-6}$ alkylene radical, especially ethylene or tetramethylene, and $A^1$ is m- or p-phenylene.

Macrocyclic oligomer mixtures of the above-defined types, and especially the polycarbonate and polyester oligomers, usually consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

Said oligomer mixtures contain very low proportions of linear oligomers; in general, no more than about 5% of such linear oligomers, if any, are present. They also preferably contain little or no linear polymer of high molecular weight. Any such polymer is preferably removed by art-recognized methods, such as precipitation with a non-solvent for said polymer.

Any linear polymer which consists essentially of structural units different from those of the macrocyclic oligomers may be employed in the present invention. By "linear" is meant polymers containing a single linear chain, as well as branched polymers containing at least about 50 structural units in linear configuration.

The linear polymer may be an addition or a condensation polymer. It may be a polymer of the same general type as the macrocyclic oligomers (e.g., both may be polycarbonates), provided the structural units in the linear polymer and the oligomer are different. Thus, it is within the scope of the invention to employ, for example, macrocyclic bisphenol A polycarbonate oligomers in combination with a linear 2,2-bis(3,5-dimethyl-4-hydroxyphenyl)propane polycarbonate.

Illustrative condensation polymers which may be employed as linear polymers include polyesters, polyamides, polysulfones, polycarbonates, polyformals, polyphenylene ethers and polyimides. Most often, however, addition polymers are employed. They include polymers prepared by free radical methods from the following monomers:

(1) Unsaturated alcohols and esters thereof: Allyl, methallyl, crotyl, 1-chloroallyl, 2-chloroallyl, cinnamyl, vinyl, methylvinyl, 1-phenallyl and butenyl alcohols and esters of such alcohols with saturated acids such as acetic, phenylacetic, propionic, butyric, valeric, caproic and stearic; with unsaturated acids such as acrylic, α-substituted acrylic (including alkylacrylic, e.g., methacrylic, ethylacrylic, propylacrylic, etc. and arylacrylic such as phenylacrylic), crotonic, oleic, linolenic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g., benzoic, phthalic, terephthalic and benzoylphthalic acids.

(2) Unsaturated acids (examples of which appear above) and esters thereof with lower saturated alcohols, such as methyl, ethyl, propyl, isopropyl, butyl, isobutyl, sec-butyl, tert-butyl, 2-ethylhexyl and cyclohexyl alcohols and with saturated lower polyhydric alcohols such as ethylene glycol, propylene glycol, tetramethylene glycol, neopentyl glycol and trimethylopropane.

(3) Unsaturated lower polyhydric alcohols, e.g., butenediol, and esters thereof with saturated and unsaturated aliphatic and aromatic, monobasic and polybasic acids, examples of which appear above.

(4) Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.

(5) Vinyl cyclic compounds including styrene, o-, m-, p-chlorostyrenes, bromostyrenes, fluorostyrenes, methylstyrenes, ethylstyrenes and cyanostyrenes; di-, tri-, and tetrachlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene and heterocycles such as vinylfuran, vinylpridine, vinylbenzofuran, N-vinyl carbazole, N-vinylpyrrolidone and N-vinyloxazolidone.

(6) Unsaturated ethers such as methyl vinyl ether, ethyl vinyl ether, cyclohexyl vinyl ether, octyl vinyl ether, diallyl ether, ethyl methallyl ether and allyl ethyl ether.

(7) Unsaturated ketones, e.g., methyl vinyl ketone and ethyl vinyl ketone.

(8) Unsaturated amides, such as acrylamide, methacrylamide, N-phenylacrylamide, N-allylacrylamide, N- methylolacrylamide, N-allylcaprolactam and diacetone acrylamide.

(9) Unsaturated aliphatic hydrocarbons, for instance, ethylene, propylene, butenes, butadiene, isoprene, 2-chlorobutadiene and α-olefins in general.

(10) Unsaturated alkyl halides, e.g., vinyl fluoride, vinyl chloride, vinyl bromide, vinylidene chloride, vinylidene bromide, allyl chloride and allyl bromide.

(11) Unsaturated acid anhydrides, e.g., maleic, citraconic, itaconic, bis-4-cyclohexane-1,2-dicarboxylic and bicyclo(2.2.1.)-5-heptene-2,3-dicarboxylic anhydrides.

(12) Unsaturated nitriles, e.g., acrylonitrile, methacrylonitrile and other substituted acrylonitriles.

It is frequently found that particularly advantageous compositions of this invention are prepared by employment of a styrene-acrylonitrile copolymer (hereinafter sometimes "SAN copolymer") as the linear polymer constituent. In particular, SAN copolymers containing up to 26% (by weight) acrylonitrile may be blended with macrocyclic polycarbonate oligomers, particularly bisphenol A oligomers, to produce completely miscible blends. At higher acrylonitrile concentrations in the SAN copolymer, the compositions obtained may be hazy or may otherwise show phase separation; however, clear films may be obtained as described in Examples 8–12.

The compositions of this invention may be prepared by any suitable intimate blending method. It is usually convenient to employ solvent blending or melt blending. For solvent blending, it is usually preferred to employ relatively high boiling solvents such as o-dichlorobenzene, trichlorobenzene and dimethyl sulfoxide.

Even when melt blending is employed, it may on occasion be advantageous to incorporate minor proportions of a mutual solvent for macrocyclic oligomers and polymer to ensure formation of a miscible blend. Suitable solvents for this purpose are generally those which permit blending temperatures of at least about 110° and preferably at least about 125° C. Toluene, xylene and chlorobenzene are examples.

The proportions of macrocyclic oligomers and linear polymer in the compositions of this invention are subject to wide variation. In general, the macrocyclic oligomers will be present in the amount of about 10–90%, preferably about 30–70%, by weight.

The compositions of this invention may be heated in contact with initiators of macrocyclic oligomer polymerization, to yield resin blends comprising the linear polymer and a linear polymerization product of the macrocyclic oligomers. Said method of preparing such resin blends is another aspect of the invention. It may, for example, be employed to effect polymerization during a molding operation, after extrusion at a temperature below that at which polymerization takes place at a substantial rate.

Any material known to polymerize the macrocyclic oligomers present in the blend may be employed as the initiator. Illustrative initiators are listed in the above-identified patents incorporated by reference herein, as well as in other patents. They may be employed in conventional quantities based on the proportion of macrocyclic oligomers in the blend. In general, the concentration of polymerization initiator will be about 0.01–1.0 mole percent, based on structural units in the oligomers. Typical polymerization temperatures are generally in the range of about 250°–350° C.

The invention is illustrated by the following examples. All parts, proportions and percentages are by weight, except for proportions of initiators of macrocyclic oligomer polymerization which are mole percentages based on structural units in the oligomers.

EXAMPLES 1–7

Blends of equal weights of cyclic polycarbonate oligomers and various linear polymers were prepared as solutions in trichlorobenzene, and were cast into thin films by evaporation of the solvent at 200°–210° C. The cyclic polycarbonate oligomers employed were bisphenol A polycarbonate oligomers free from linear polymer, having a glass transition temperature of 150° C. The films were dried in a vacuum oven at 210° C. and inspected for clarity. The results are given in Table I.

TABLE I

| Example | Linear polymer | Film Condition |
|---|---|---|
| 1 | Poly(2,6-dimethyl-1,4-phenylene ether), intrinsic visc. 0.49 dl./g. (CHCl$_3$, 25° C.) | Clear |
| 2 | Polystyrene, Mw 350,000 | Clear |
| 3 | Polyetherimide from m-phenylenediamine & 2,2-bis-[4-(3,4-dicarboxyphenoxy)]propane dianhydride, intrinsic visc. 0.48 dl./g. | Clear |
| 4 | Bisphenol A polysulfone from Westlake Plastics, Mn 25,000 | Clear |
| 5 | 2,2-bis(4-hydroxyphenyl)-1,1-dichloroethylene polycarbonate, intrinsic visc. 0.52 dl./g. | Clear |
| 6 | 2,2-bis(3,5-dimethyl-4-hydroxyphenyl)propane polycarbonate, intrinsic visc. 0.57 dl./g. | Clear |
| 7 | Poly(methyl methacrylate), Mw 93,000 | * |

*Initially clear; became cloudy on prolonged oven drying.

EXAMPLES 8–12

Following the procedure of Examples 1–7, mixtures of equal weights of the macrocyclic bisphenol A polycarbonate oligomers employed in those examples and various SAN copolymers were dissolved in trichlorobenzene and cast into films. The results are given in Table II.

TABLE II

| Example | Mw | SAN Acrylonitrile, % | Film condition |
|---|---|---|---|
| 8 | 110,000 | 15.5 | Clear |
| 9 | 115,000 | 25.7 | Clear |
| 10 | 100,000 | 28.7 | Hazy |
| 11 | 95,000 | 30.6 | ** |
| 12 | 130,000 | 35 | *** |

**Initially clear; became hazy on prolonged heating.
***Phase separation until addition of small quantity of dimethyl sulfoxide.

It is apparent that clear films are formed with SAN copolymers having acrylonitrile contents up to 26%. At the higher acrylonitrile contents of Examples 10–12, varying degrees of haze or phase separation were observed. However, clear films could be formed even at those proportions by dissolving the cyclic oligomers and polymer separately and blending the two solutions just before the film was cast, by incorporating a minor proportion of acetic acid in the solution to neutralize basic impurities causing premature polymerization of the cyclic oligomers, or by a combination of the two.

EXAMPLE 13

Equal weights of the macrocyclic bisphenol A polycarbonate oligomers of Example 1 and a SAN copolymer having a weight average molecular weight of 118,000 and containing 25% acrylonitrile units were melt blended in a Helicone mixer at 230° C. A homogeneous, single-phase material having a glass transition temperature of 124° C. was obtained.

The melt rheology of the mixture was determined at 175°, 200° and 300° C. The viscosity remained substantially stable at 175° and 200° C.; at 300° C., a rapid viscosity increase was observed after about 16 minutes, probably because of initiation of polymerization of the macrocyclic oligomers by basic impurities present in the blend.

Upon addition of 0.4 mole percent tetra-n-butylammonium tetraphenylborate to the blend at 270° C., the cyclics were converted to linear polycarbonate in less than 90 seconds. The weight average molecular weight of said polycarbonate was found to be 31,800. The resin blend showed two glass transition temperatures and was shown by transmission electron microscopy to comprise initially a fine dispersion of polycarbonate in SAN copolymer, which changed in time upon continued blending at 270° C. to a system in which SAN copolymer domains with a particle size above 25 microns were dispersed in a polycarbonate matrix.

EXAMPLE 14

The oligomer-SAN copolymer blend of Example 13 was dry blended with 0.86 mole percent tetra-n-butylammonium tetraphenylborate and the mixture was injection molded at 260° C. The macrocyclic oligomers were completely converted to linear polycarbonate having a weight average molecular weight of 24,240. Resin blends with polycarbonates of higher molecular weight were obtained by employing lower proportions of tetra-n-butylammonium tetraphenylborate.

EXAMPLES 15-20

Blends of equal weights of various linear polymers and linear polymer-free macrocyclic poly(butylene terephthalate) oligomers were prepared by casting films from o-dichlorobenzene or dimethylacetamide at 200° C. and quenching the cast films to 0° C. after residual solvent had been removed under vacuum. In each case, a single-phase clear film was obtained. The linear polymers employed, and the glass transition temperatures of the polymers alone and of the blends, are listed in Table III.

TABLE III

| | | Tg, °C. | |
|---|---|---|---|
| Example | Linear polymer | Polymer | Blend |
| 15 | Bisphenol A polyformal | 90 | 56 |
| 16 | Bisphenol A polycarbonate | 145 | 78 |
| 17 | Poly(methyl methacrylate) | 100 | 64 |
| 18 | Polyetherimide from m-phenylenediamine & 2,2-bis[4-(3,4-dicarboxyphenoxy)]-propane dianhydride | 215 | 95 |
| 19 | Bisphenol A polysulfone | 185 | 74 |
| 20 | SAN of Example 13 | 105 | 60 |

The macrocyclic poly(butylene terephthalate) oligomers in the blends could be polymerized by heating with 1.0 mole percent of lithium salicylate, di-n-butyltin oxide or 2,2-di-n-butyl-2-stanna-1,3-dioxacycloheptane.

What is claimed is:

1. A composition comprising an intimate physical mixture of at least one macrocyclic poly(alkylene dicarboxylate) oligomer and at least one linear styrene-acrylonitrile copolymer.

2. A composition according to claim 1 which comprises a macrocyclic poly(alkylene dicarboxylate) oligomer mixture.

3. A composition according to claim 2 wherein the poly(alkylene dicarboxylate) is poly(butylene terephthalate).

4. A method of preparing a resin blend which comprises heating a composition according to claim 1 in contact with an initiator of macrocyclic oligomer polymerization.

5. A method of preparing a resin blend which comprises heating a composition according to claim 2 in contact with an initiator of macrocyclic oligomer polymerization.

* * * * *